United States Patent
Agiwal et al.

(10) Patent No.: US 11,272,548 B2
(45) Date of Patent: Mar. 8, 2022

(54) METHOD AND APPARATUS FOR SWITCHING BETWEEN 2 STEP AND 4 STEP RANDOM ACCESS (RA) PROCEDURES AND CONTENTION RESOLUTIONS

(71) Applicant: Samsung Electronics Co., Ltd., Suwon-si (KR)

(72) Inventors: Anil Agiwal, Suwon-si (KR); Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 16/857,796

(22) Filed: Apr. 24, 2020

(65) Prior Publication Data
US 2020/0344812 A1 Oct. 29, 2020

Related U.S. Application Data

(60) Provisional application No. 62/837,843, filed on Apr. 24, 2019.

(51) Int. Cl.
*H04W 74/08* (2009.01)
*H04W 76/11* (2018.01)
(Continued)

(52) U.S. Cl.
CPC ....... *H04W 74/0833* (2013.01); *H04L 1/1819* (2013.01); *H04L 5/0055* (2013.01);
(Continued)

(58) Field of Classification Search
CPC . H04W 74/0833; H04W 76/11; H04W 52/36; H04W 72/042; H04W 74/0891; H04L 1/1819; H04L 5/0055
(Continued)

(56) References Cited

U.S. PATENT DOCUMENTS 10,033,499 B2 7/2018 Ahn et al.
2014/0022974 A1* 1/2014 Eriksson ........... H04W 52/0254
370/311
(Continued)

FOREIGN PATENT DOCUMENTS

WO 2013/048170 A2 4/2013

OTHER PUBLICATIONS

Oppo, "Contention resolution for 2-step RACH", R2-1903293, 3GPP TSG RAN WG2 #105b, Xi'an, China, Mar. 28, 2019, pp. 1-5, Mar. 28, 2019.
(Continued)

*Primary Examiner* — Obaidul Huq
(74) *Attorney, Agent, or Firm* — Jefferson IP Law, LLP

(57) ABSTRACT

A communication method and system for converging a $5^{th}$ generation (5G) communication system for supporting higher data rates beyond a $4^{th}$ generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method for performing a random access (RA) procedure is provided. The method comprises transmitting a first message of a 2 step RA procedure including an RA preamble and a cell-radio network temporary identifier (C-RNTI), receiving a second message of the 2 step RA procedure on a physical downlink control channel (PDCCH) addressed to the C-RNTI, identifying whether a time alignment timer (TAT) is running or not, and determining that the 2 step RA procedure is completed successfully in case that the TAT is running and the PDCCH schedules an uplink (UL) transport block (TB) for a new transmission.

14 Claims, 11 Drawing Sheets

(51) Int. Cl.
  *H04W 52/36* (2009.01)
  *H04L 1/18* (2006.01)
  *H04L 5/00* (2006.01)
  *H04W 72/04* (2009.01)

(52) U.S. Cl.
  CPC ......... *H04W 52/36* (2013.01); *H04W 72/042* (2013.01); *H04W 74/0891* (2013.01); *H04W 76/11* (2018.02)

(58) Field of Classification Search
  USPC .................................... 370/310, 328, 329
  See application file for complete search history.

(56) References Cited

U.S. PATENT DOCUMENTS

| | | | | |
|---|---|---|---|---|
| 2018/0279376 A1* | 9/2018 | Dinan | ............... | H04W 74/0833 |
| 2019/0132778 A1* | 5/2019 | Park | ..................... | H04W 76/19 |
| 2019/0289660 A1* | 9/2019 | Yi | ....................... | H04W 74/006 |
| 2020/0107372 A1 | 4/2020 | Agiwal et al. | | |

OTHER PUBLICATIONS

Nokia et al., "2-step RACH Procedure Feature lead summary", R1-1905670, 3GPP TSG RAN WG1 #96b, Xi'an, China, Apr. 8, 2019, pp. 1-92, Apr. 8, 2019.

Ericsson, "2-step Random Access for NR-U", R2-1901752, 3GPP TSG RAN WG2 #105, Athens, Greece, Feb. 15, 2019, pp. 1-3, Feb. 15, 2019.

Mediatek Inc., "Further considerations on 2-step RACH", R2-1813965, 3GPP TSG RAN WG2 #103b, Chengdu, China, Sep. 27, 2018, pp. 1-7, Sep. 27, 2018.

International Search Report dated Jul. 31, 2020, issued in International Application No. PCT/KR2020/005477.

* cited by examiner

METHOD AND APPARATUS FOR SWITCHING BETWEEN 2 STEP AND 4 STEP RANDOM ACCESS (RA) PROCEDURES AND CONTENTION RESOLUTIONS

CROSS-REFERENCE TO RELATED APPLICATION(S)

This application is based on and claims priority under 35 U.S.C. § 119(e) of a U.S. Provisional application Ser. No. 62/837,843, filed on Apr. 24, 2019, in the U.S. Patent and Trademark Office, the disclosure of which is incorporated by reference herein in its entirety.

BACKGROUND

1. Field

The disclosure relates to a method for switching between 2 step and 4 step random access (RA) procedures and contention resolutions.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also referred to as a 'beyond 4G network' or a 'post long term evolution (LTE) System.' The 5G wireless communication system is considered to be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports the voice service and data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various services with diverse requirements, e.g., high-speed data services, support ultra-reliability and low-latency applications.

In addition, the 5G wireless communication system is expected to address different use cases having quite different requirements in terms of data rate, latency, reliability, mobility etc. However, it is expected that the design of the air-interface of the 5G wireless communication system will be flexible enough to serve user equipments (UEs) having quite different capabilities depending on the use case and market segment in which the UE caters service to the end customer. Example use cases the 5G wireless communication system is expected to address includes enhanced mobile broadband (eMBB), massive machine type communication (m-MTC), ultra-reliable low-latency communication (URLL), etc. The eMBB requirements (e.g., tens of Gbps data rate, low-latency, high-mobility, and so on) address the market segment representing the wireless broadband subscribers needing internet connectivity everywhere, all the time and on the go. The m-MTC requirements (e.g., very high connection density, infrequent data transmission, very long battery life, low mobility address and so on) address the market segment representing the IoT/IoE envisioning connectivity of billions of devices. The URLL requirements (e.g., very low latency, very high reliability variable mobility, and so forth) address the market segment representing the Industrial automation application and vehicle-to-vehicle/vehicle-to-infrastructure communication that is foreseen as one of the enablers for autonomous cars.

In the 5G (also referred as NR or new radio) wireless communication system, random access (RA) procedure is used to achieve uplink time synchronization. RA procedure is used during initial access, handover, radio resource control (RRC) connection re-establishment procedure, scheduling request transmission, secondary cell group (SCG) addition/modification and data or control information transmission in uplink by non-synchronized user equipment (UE) in RRC_CONNECTED state. During the RA procedure (which comprise of 4 step s), UE first transmits RA preamble (also referred as message 1 (Msg1)) and then waits for random access response (RAR) or message 2 (Msg2) in the RAR window corresponding to its RA preamble transmission. Next generation node B (gNB) transmits the RAR on physical downlink shared channel (PDSCH) addressed to RA-radio network temporary identifier (RNTI). RA-RNTI identifies the time-frequency resource (also referred as physical random access channel (PRACH) occasion or PRACH transmission (TX) occasion or random access channel (RACH) occasion) in which RA preamble was detected by gNB. The maximum size of RAR-window is one radio frame, i.e., 10 ms. The RA-RNTI is calculated as follows: RA-RNTI=1+$s\_id$+14*$t\_id$+14*80*$f\_id$+14*80*8*$ul\_carrier\_id$, where $s\_id$ is the index of the first orthogonal frequency division multiplexing (OFDM) symbol of the PRACH occasion where UE has transmitted Msg1, i.e., RA preamble; 0≤$s\_id$<14, $t\_id$ is the index of the first slot of the PRACH occasion (0≤$t\_id$<80), $f\_id$ is the index of the PRACH occasion within the slot in the frequency domain (0≤$f\_id$<8), and $ul\_carrier\_id$ is the uplink (UL) carrier used for Msg1 transmission (0 for normal uplink (NUL) carrier and 1 for supplementary uplink (SUL) carrier).

Several RARs for various RA preamble detected by gNB can be multiplexed in the same RAR media access control (MAC) protocol data unit (PDU) by gNB. An RAR in MAC PDU corresponds to UE's RA preamble transmission if it includes random access preamble identifier (RAPID) of RA preamble transmitted by it. If the RAR corresponding to its RA preamble transmission is not received during the RAR window and UE has not yet transmitted the RA preamble for a configurable (configured by gNB in RACH configuration) number of times, UE retransmits the RA preamble.

If the RAR corresponding to its RA preamble transmission is received and UE has transmitted a dedicated RA preamble, RA procedure is considered successful. If the UE has transmitted a non-dedicated (i.e., contention-based) RA preamble then upon successful reception of RAR, UE transmits message 3 (Msg3) in UL grant received in RAR. Msg3 includes message such as RRC connection request, RRC connection re-establishment request, RRC handover confirm, scheduling request, etc. It also includes the UE identity (i.e., cell-RNTI (C-RNTI) or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE retransmits the RA preamble.

In the 5G (also referred as NR or New Radio) wireless communication system, 2 step contention-free RA (CFRA) procedure is also supported. CFRA procedure is used for scenarios such as handover where low latency is required, timing advance establishment for secondary cell (Scell), etc. gNB assigns to UE non-contention RA preamble in dedicated signaling. UE transmits the assigned non-contention RA preamble. gNB transmits the RAR on PDSCH addressed to RA-RNTI. RAR conveys RA preamble identifier and timing alignment information. RAR may also include UL grant. RAR is transmitted in RAR window similar to contention-based RA procedure. Contention free RA procedure terminates after receiving the RAR.

In order to reduce the latency of 4 step contention based RA (CBRA) procedure, a 2 step RACH procedure is being studied. The 2 step RACH procedure refers to the procedure which can complete RACH procedure in two steps. It comprises of 2 messages, i.e., message A (MsgA) and message B (MsgB).

FIG. 1 shows signaling flows between a UE and a gNB for 2 step RACH procedure according to related art.

Referring to FIG. 1, the UE transmits MsgA to the gNB at operation 110. In response, the gNB transmits MsgB to the UE at operation 120. The channel structure of MsgA includes PRACH preamble and physical uplink shared channel (PUSCH) carrying payload. PRACH preamble and PUSCH in a MsgA is time division multiplexed (TDMed).

In the 2 step CBRA procedure, UE sends additional information, i.e., UE identifier (ID) along with PRACH preamble in first step (i.e., MsgA). The UE ID can be one of random ID, S-TMSI, C-RNTI, resume ID, international mobile subscriber identity (IMSI), idle mode ID, inactive mode ID, inactive-RNTI (I-RNTI) etc. The UE ID can be different in different scenarios in which UE performs the 2 step RA procedure. When UE performs 2 step RA procedure after power on (e.g., before it is attached/registered to the network), then the UE ID is the random ID. When UE performs the 2 step RA procedure in IDLE state after it is attached/registered to the network, the UE ID is S-TMSI. If the UE has an assigned C-RNTI (e.g., in connected state), the UE ID is C-RNTI. In case the UE is in INACTIVE state, the UE ID is resume ID. In case MsgA includes dedicated RACH preamble, UE ID can be skipped (i.e., not included) in MsgA. In this case, gNB can identify the UE based on a dedicated preamble.

In addition to the UE ID, some additional control information can be transmitted in MsgA. The control information may include one or more of connection request indication, connection (re-)establishment cause, connection resume request indication, system information (SI) request indication, information about SI message(s) requested, buffer status indication/report, beam information (e.g., one or more downlink (DL) TX beam ID(s) or synchronization signal block (SSB) ID(s)), beam failure recovery indication/information, data indicator, cell/base station (BS)/transmission reception point (TRP) switching indication, connection re-establishment indication, reconfiguration complete or handover complete message, etc. Note that any other control information is not precluded. Similar to 2 step CBRA, in a 2 step CFRA procedure, additional information can also be transmitted in MsgA in addition to the preamble.

In the disclosure, the 4 step RA procedure refers to a legacy RA procedure comprising Msg1 to Msg4 as described in the TS 38.321 and TS 36.321 specifications.

Issue 1: In RRC CONNECTED state, during the 2 step RACH procedure, the UE transmits MsgA wherein the C-RNTI is included in the MsgA payload. After transmitting the MsgA in the 2 step RA procedure, the UE monitors PDCCH for MsgB reception. In an embodiment, UE monitors PDCCH for MsgB reception in a time window wherein the window starts at an offset from the end of the PUSCH transmission of MsgA. The size of the window is signaled by gNB in SI or RRC signaling. According to current proposals, after transmitting the MsgA including C-RNTI, if the UE receives PDCCH addressed to C-RNTI, contention resolution is considered successful and 2 step RACH procedure is successfully completed. During the 2 step RACH procedure for handover, SCG addition etc., the UE needs to also receive a timing advance (TA) command (12 bit). Note that the UE will need the TA to transmit a hybrid automatic repeat request (HARQ) acknowledge (ACK) (if PDCCH schedules DL transport block (TB)) or PUSCH (if PDCCH schedules UL TB). However, in the above operation, the TA command is not received. Thus, a contention resolution mechanism would benefit from being enhanced.

Issue 2: According to current proposals, the network can control the number of times 'N', and a UE can transmit MsgA during the RA procedure. If the random access procedure is not successfully completed even after transmitting the MsgA 'N' times, the UE fallbacks to 4 step RACH procedure, i.e., the UE only (re-) transmits the PRACH preamble for the remaining RACH procedure. In case of congestion, it would be beneficial for there to be a mechanism to switch the UEs from 2 step RACH procedure to 4 step RACH procedure.

The above information is presented as background information only to assist with an understanding of the disclosure. No determination has been made, and no assertion is made, as to whether any of the above might be applicable as prior art with regard to the disclosure.

SUMMARY

During a 2 step random access channel (RACH) procedure, a UE needs to receive a timing advance (TA) command. Thus, contention resolution mechanism for the 2 step RACH procedure needs to be enhanced to receive TA command.

In case of congestion, it would be beneficial for there to be a mechanism to switch the UEs from 2 step RACH procedure to 4 step RACH procedure.

Aspects of the disclosure are to address at least the above-mentioned problems and/or disadvantages and to provide at least the advantages described below. Accordingly, an aspect of the disclosure is to provide a communication method and system for converging a 5$^{th}$ generation (5G) communication system for supporting higher data rates beyond a 4$^{th}$ generation (4G) system.

In accordance with an aspect of the disclosure, a method by a terminal for performing a random access (RA) procedure is provided. The method includes transmitting, to a base station, a first message of a 2 step RA procedure including an RA preamble and a cell-radio network temporary identifier (C-RNTI), receiving, from the base station, a second message of the 2 step RA procedure on a physical downlink control channel (PDCCH) addressed to the C-RNTI, identifying whether a time alignment timer (TAT) is running or not, and determining that the 2 step RA procedure is completed successfully in case that the TAT is running and the PDCCH schedules an uplink (UL) transport block (TB) for a new transmission.

In accordance with another aspect of the disclosure, a method by a base station for performing an RA procedure is provided. The method includes receiving, from a terminal, a first message of a 2 step RA procedure including an RA preamble and a C-RNTI, and transmitting, to the terminal, a second message of the 2 step RA procedure on a PDCCH addressed to the C-RNTI. The 2 step RA procedure is completed successfully in case that a TAT of the terminal is running and the PDCCH schedules a UL TB for a new transmission.

In accordance with another aspect of the disclosure, a terminal in a wireless communication system is provided. The terminal includes a transceiver and at least one processor configured to transmit, to a base station via the transceiver, a first message of a 2 step RA procedure including an RA preamble and a C-RNTI, receive, from the base station via the transceiver, a second message of the 2 step RA procedure on a PDCCH addressed to the C-RNTI, identify whether a TAT is running or not, and determine that the 2 step RA procedure is completed successfully in case that the TAT is running and the PDCCH schedules a UL TB for a new transmission.

In accordance with another aspect of the disclosure, a base station in a wireless communication system is provided. The base station includes a transceiver and at least one processor configured to receive, from a terminal via the transceiver, a first message of a 2 step RA procedure including an RA preamble and a C-RNTI, and transmit, to the terminal via the transceiver, a second message of the 2 step RA procedure on a PDCCH addressed to the C-RNTI. The 2 step RA procedure is completed successfully in case that a TAT of the terminal is running and the PDCCH schedules a UL TB for a new transmission.

Additional aspects will be set forth in part in the description which follows and, in part, will be apparent from the description, or may be learned by practice of the presented embodiments.

The UE uses a TA to transmit hybrid automatic repeat request (HARQ) acknowledge (ACK) (if physical downlink control channel (PDCCH) schedules downlink (DL) transport block (TB)) or physical uplink shared channel (PUSCH) (if PDCCH schedules uplink (UL) TB).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
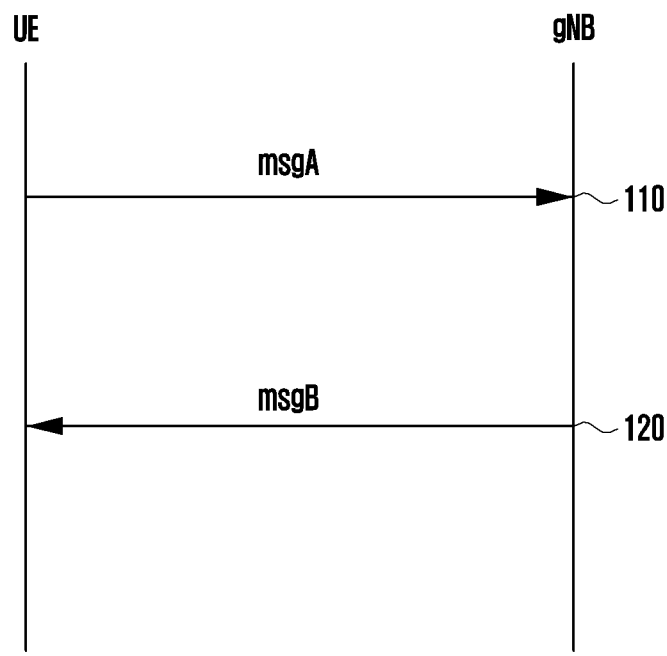
FIG. 1 shows signaling flows between a user equipment (UE) and a next generation node B (gNB) for 2 step random access channel (RACH) procedure according to related art.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

I. Contention Resolution for 2 Step Random Access (RA) in Radio Resource Control (RRC) CONNECTED In RRC_CONNECTED state, during the 2 step random access channel (RACH) procedure, UE transmits message A (MsgA) wherein the cell-radio network temporary identifier (C-RNTI) is included in MsgA payload. After transmitting the MsgA in 2 step RA procedure, UE monitors physical downlink control channel (PDCCH) for message B (MsgB) reception. In an embodiment, UE monitors PDCCH for MsgB reception in a time window wherein the window starts at an offset from the end of the physical uplink shared channel (PUSCH) transmission of MsgA. The size of the window is signaled by gNB in system information (SI) or RRC signaling. According to current proposals, after transmitting the MsgA including C-RNTI, if UE receives PDCCH addressed to C-RNTI, contention resolution is considered successful and 2 step RACH procedure is successfully completed. During the 2 step RACH procedure for handover, SCG addition etc., UE needs to also receive timing advance (TA) command (12 bit). Note that UE will need TA to transmit hybrid automatic repeat request (HARQ) acknowledge (ACK) (if PDCCH schedules downlink (DL) transport block (TB)) or PUSCH (if PDCCH schedules uplink (UL) TB).

Method 1:

UE is in RRC_CONNECTED and 2 step RACH procedure is initiated. RACH procedure can be initiated by UE (e.g., for scheduling request (SR) or upon receiving reconfiguration with sync from gNB) or it can be initiated by network (e.g., by sending the PDCCH order).

1. UE first selects a suitable synchronization signal block (SSB) where an SSB is suitable if synchronization signal-reference signal received power (SS-RSRP) of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and physical random access channel (PRACH) occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or message 2 (Msg2)) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, media access control (MAC) control elements (CEs)) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the common control channel (CCCH) logical channel and the CCCH service data unit (SDU) size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE is in RRC_CONNECTED and hence it includes at least C-RNTI in MsgA payload. Other information (e.g., buffer state report (BSR), power headroom report (PHR), etc.) if available can be included according to logical channel prioritization.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s).

7. Criteria for successful contention resolution and 2 step RA procedure completion in case C-RNTI was included in MsgA FIG. 2 illustrates a flowchart for 2 step RA procedure according to an embodiment of the disclosure.

Figure 2:
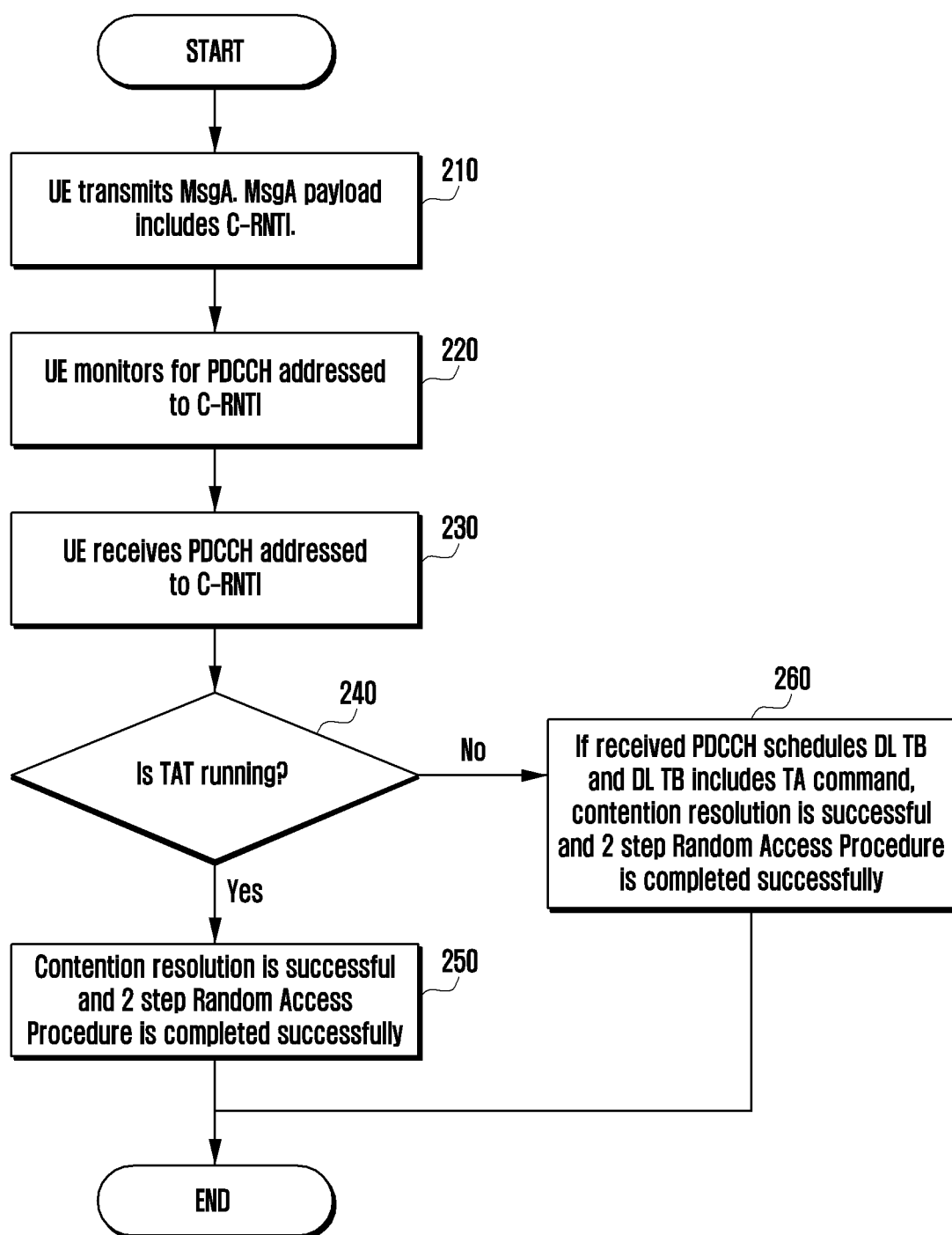
FIG. 2 illustrates a flowchart for 2 step random access (RA) procedure according to an embodiment of the disclosure.

Referring to FIG. 2, UE transmits MsgA at operation 210. MsgA payload includes C-RNTI. The UE monitors for PDCCH addressed to C-RNTI at operation 220. The UE receives PDCCH addressed to C-RNTI at operation 230. The UE determines whether TimingAllignementTimer (TAT) is running at operation 240. Note that there can be one or more timing advanced groups (TAGs) in the UE. Timing advanced group is a group of serving cells that is configured by RRC and that, for the cells with a UL configured, uses the same timing reference cell and the same timing advance value. A timing advance group containing the special cell (SpCell) of a MAC entity is referred to as primary timing advance group (PTAG), whereas the term secondary timing advance group (STAG) refers to other TAGs. TAT is maintained separately for each TAG. At operation 240, TAT corresponds to the TAG of the cell on which MsgA is transmitted. If 2 step RA procedure is supported only for SpCell, TAT corresponds to the PTAG.

If TAT is running and UE receives PDCCH addressed to C-RNTI, contention resolution is successful and 2 step RA procedure is completed successfully at operation 250. In one embodiment, this PDCCH addressed to C-RNTI schedules UL TB. In another embodiment, this PDCCH addressed to C-RNTI schedules UL TB or DL TB.

Else if TAT is not running and UE receives PDCCH addressed to C-RNTI scheduling DL TB and absolute timing advance command is received in the scheduled DL TB, contention resolution is successful and 2 step RA procedure is completed successfully at operation 260.

Absolute timing advance command can be included in MAC PDU (e.g. in a MAC CE). Alternately, it can be included in downlink control information (DCI). The received absolute timing advance command is applied to TAG of the cell on which MsgA is transmitted. If 2 step RA procedure is supported only for SpCell, absolute timing advance command is applied to the PTAG.

Absolute timing advance command [11, TS 38.321], TA, for a timing advanced group (TAG) indicates $N_{TA}$ values by index values of $T_A$=0, 1, 2, . . . , 3846, where an amount of the time alignment for the TAG with subcarrier spacing (SCS) of $2^\mu$·15 kHz is $N_{TA}=T_A \cdot 16 \cdot 64/2^\mu$. $N_{TA}$ is defined in [4, TS 38.211].

8. SCS for TA Command: In case of 2 step RACH procedure, $N_{TA}$ is relative to the SCS of the first uplink transmission from the UE after the reception of the MsgB. In another embodiment, it is relative to the SCS of the PUSCH in MsgA. In another embodiment, it is relative to the SCS of the first uplink transmission if UL grant is received in MsgB/Msg2, and it is relative to the SCS of the PUSCH in MsgA if UL grant is not received in MsgB. In 4 step RACH procedure, if TAT timer is running, the received TA command is ignored. In an embodiment, in case of 2 step RACH procedure irrespective of TAT timer is running or not, UE applies the received TA command.

Method 2:

UE is in RRC_CONNECTED and 2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE is in RRC_CONNECTED and hence it includes at least C-RNTI in MsgA payload. Other information (e.g., BSR, PHR, etc.) if available can be included according to logical channel prioritization.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s).

7. Criteria for successful contention resolution and 2 step RA procedure completion in case C-RNTI was included in MsgA FIG. 3 illustrates a flowchart for 2 step RA procedure according to an embodiment of the disclosure.

Figure 3:
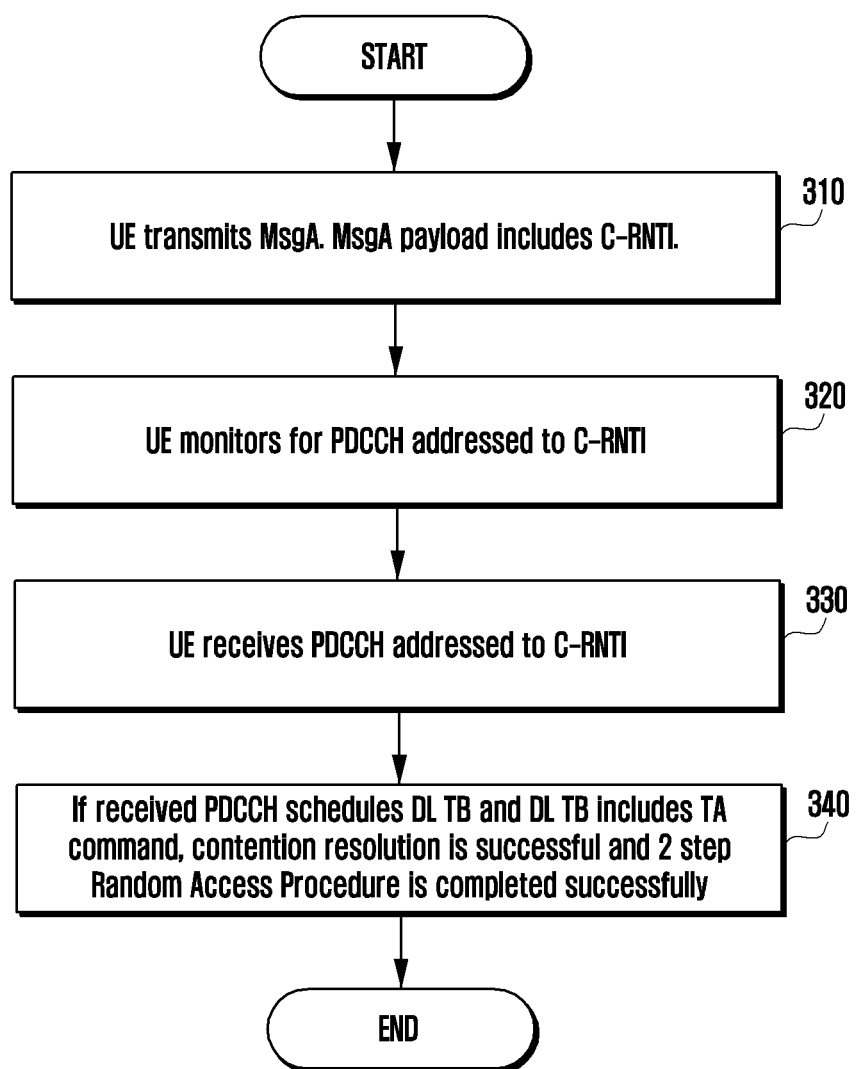
FIG. 3 illustrates a flowchart for 2 step RA procedure according to an embodiment of the disclosure.

Referring to FIG. 3, the UE transmits MsgA at operation 310. MsgA payload includes C-RNTI. The UE monitors for PDCCH addressed to C-RNTI at operation 320. The UE receives PDCCH addressed to C-RNTI at operation 330.

If the UE receives PDCCH addressed to C-RNTI scheduling DL TB and absolute TA command is received in scheduled DL TB, contention resolution is successful and 2 step RA procedure is completed successfully at operation 340. The received absolute timing advance command is applied to TAG of the cell on which MsgA is transmitted. If 2 step RA procedure is supported only for SpCell, absolute timing advance command is applied to the PTAG.

Absolute timing advance command can be included in MAC PDU. Alternately, it can be included in DCI.

Absolute timing advance command [11, TS 38.321], $T_A$, for a TAG indicates $N_{TA}$ values by index values of $T_A$=0, 1, 2, . . . , 3846, where an amount of the time alignment for the TAG with SCS of $2^\mu$·15 kHz is $N_{TA}=T_A \cdot 16 \cdot 64/2^\mu$. $N_{TA}$ is defined in [4, TS 38.211].

8. SCS for TA Command: In case of 2 step RACH procedure, $N_{TA}$ is relative to the SCS of the first uplink transmission from the UE after the reception of the MsgB. In another embodiment, it is relative to the SCS of the PUSCH in MsgA. In another embodiment, it is relative to the SCS of the first uplink transmission if UL grant is received in MsgB/Msg2, and it is relative to the SCS of the PUSCH in MsgA if UL grant is not received in MsgB. In 4 step RACH procedure, if TAT timer is running, the received TA command is ignored. In an embodiment, in case of 2 step RACH procedure irrespective of TAT timer is running or not, UE applies the received TA command.

Method 3:

UE is in RRC_CONNECTED and 2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE is in RRC_CONNECTED and hence it includes at least C-RNTI in MsgA payload. Other information (e.g., BSR, PHR, etc.) if available can be included according to logical channel prioritization.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s).

7. Criteria for successful contention resolution and 2 step RA procedure completion in case C-RNTI was included in MsgA FIG. 4 illustrates a flowchart for 2 step RA procedure according to an embodiment of the disclosure.

Figure 4:
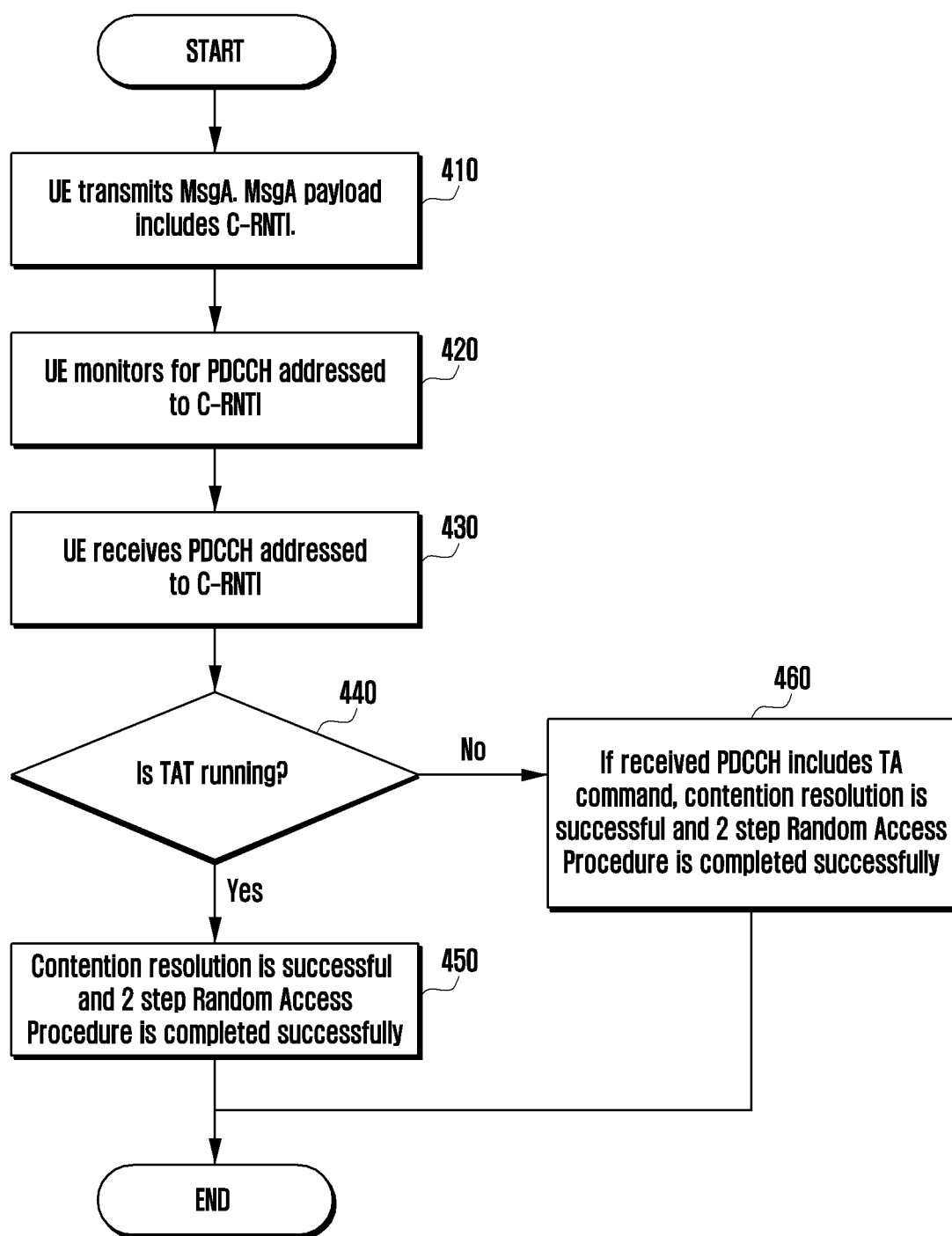
FIG. 4 illustrates a flowchart for 2 step RA procedure according to an embodiment of the disclosure.

Referring to FIG. 4, the UE transmits MsgA at operation 410. MsgA payload includes C-RNTI. The UE monitors for PDCCH addressed to C-RNTI at operation 420. The UE receives PDCCH addressed to C-RNTI at operation 430. The UE determines whether TAT is running at operation 440. Note that there can be one or more timing advanced groups in the UE. Timing advanced group is a group of serving cells that is configured by RRC and that, for the cells with a UL configured, uses the same timing reference cell and the same timing advance value. A timing advance group containing the SpCell of a MAC entity is referred to as PTAG, whereas the term STAG refers to other TAGs. TAT is maintained separately for each TAG. At operation 440, TAT corresponds to the TAG of the cell on which MsgA is transmitted. If 2 step RA procedure is supported only for SpCell, TAT corresponds to the PTAG.

If TAT is running and UE receives PDCCH addressed to C-RNTI, contention resolution is successful and 2 step RA procedure is completed successfully at operation 450. In one embodiment, this PDCCH addressed to C-RNTI schedules UL TB. In another embodiment, this PDCCH addressed to C-RNTI schedules UL TB or DL TB.

Else if TAT is not running and UE receives PDCCH addressed to C-RNTI and it includes absolute TA command, contention resolution is successful and 2 step RA procedure is completed successfully at operation 460. In one embodiment, this PDCCH addressed to C-RNTI schedules UL TB. In another embodiment, this PDCCH addressed to C-RNTI schedules UL TB or DL TB. The received absolute timing advance command is applied to TAG of the cell on which MsgA is transmitted. If 2 step RA procedure is supported only for SpCell, absolute Timing advance command is applied to the PTAG.

Absolute timing advance command [11, TS 38.321], $T_A$, for a TAG indicates $N_{TA}$ values by index values of $T_A$=0, 1, 2, ..., 3846, where an amount of the time alignment for the TAG with SCS of $2^\mu \cdot 15$ kHz is $N_{TA}=T_A \cdot 16 \cdot 64/2^\mu$. $N_{TA}$ is defined in [4, TS 38.211].

8. SCS for TA Command: In case of 2 step RACH procedure, $N_{TA}$ is relative to the SCS of the first uplink transmission from the UE after the reception of the MsgB. In another embodiment, it is relative to the SCS of the PUSCH in MsgA. In another embodiment, it is relative to the SCS of the first uplink transmission if UL grant is received in MsgB/Msg2, and it is relative to the SCS of the PUSCH in MsgA if UL grant is not received in MsgB. In 4 step RACH procedure, if TAT timer is running, the received TA command is ignored. In an embodiment, in case of 2 step RACH procedure irrespective of TAT timer is running or not, UE applies the received TA command.

Method 4:

UE is in RRC_CONNECTED and 2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE is in RRC_CONNECTED and hence it includes at least C-RNTI in MsgA payload. Other information (e.g., BSR, PHR, etc.) if available can be included according to logical channel prioritization.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s).

7. Criteria for successful contention resolution and 2 step RA procedure completion in case C-RNTI was included in MsgA FIG. 5 illustrates a flowchart for 2 step RA procedure according to an embodiment of the disclosure.

Figure 5:
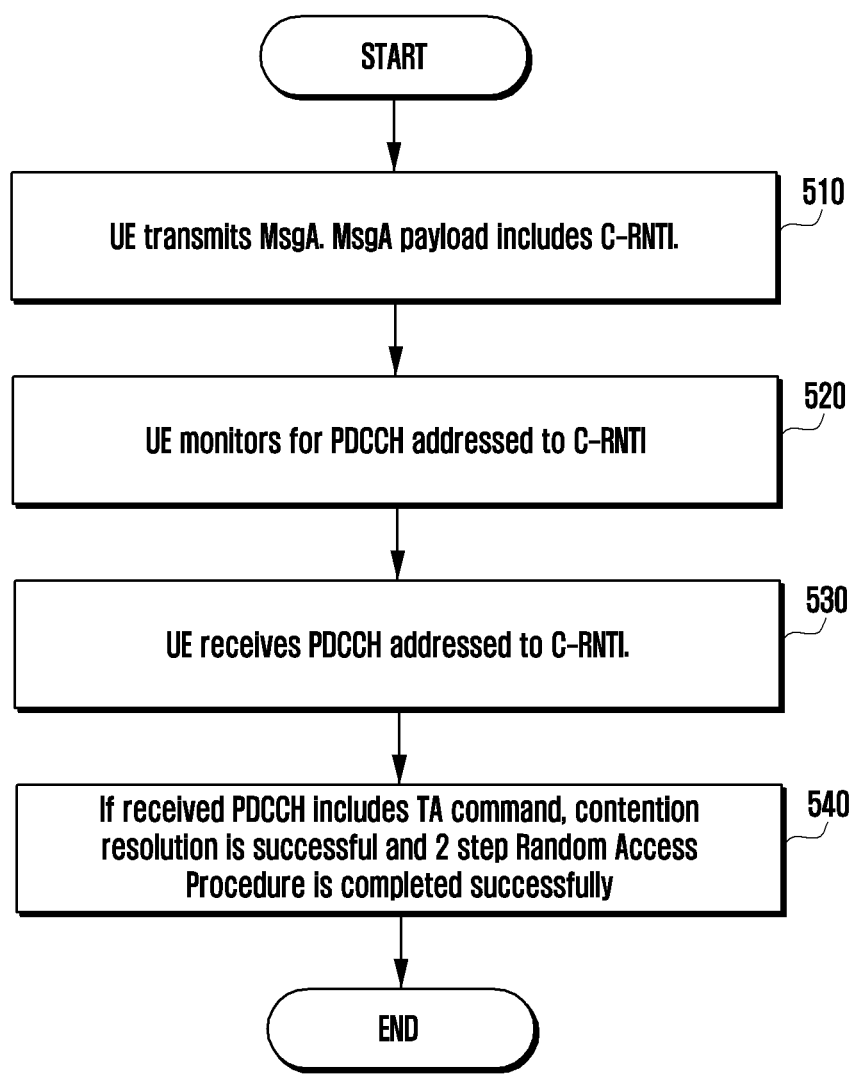
FIG. 5 illustrates a flowchart for 2 step RA procedure according to an embodiment of the disclosure.

Referring to FIG. 5, the UE transmits MsgA at operation 510. MsgA payload includes C-RNTI. The UE monitors for PDCCH addressed to C-RNTI at operation 520. The UE receives PDCCH addressed to C-RNTI at operation 530.

If UE receives PDCCH addressed to C-RNTI and it includes absolute TA command, contention resolution is successful and 2 step RA procedure is completed successfully at operation 540. In one embodiment, this PDCCH addressed to C-RNTI schedules UL TB. In another embodiment, this PDCCH addressed to C-RNTI schedules UL TB or DL TB. The received absolute timing advance command is applied to TAG of the cell on which MsgA is transmitted. If 2 step RA procedure is supported only for SpCell, absolute Timing advance command is applied to the PTAG.

Absolute timing advance command [11, TS 38.321], $T_A$, for a TAG indicates $N_{TA}$ values by index values of $T_A=0, 1, 2, \ldots, 3846$, where an amount of the time alignment for the TAG with SCS of $2^\mu \cdot 15$ kHz is $N_{TA}=T_A \cdot 16 \cdot 64/2^\mu$. $N_{TA}$ is defined in [4, TS 38.211].

8. SCS for TA Command: In case of 2 step RACH procedure, $N_{TA}$ is relative to the SCS of the first uplink transmission from the UE after the reception of the MsgB. In another embodiment, it is relative to the SCS of the PUSCH in MsgA. In another embodiment, it is relative to the SCS of the first uplink transmission if UL grant is received in MsgB/Msg2, and it is relative to the SCS of the PUSCH in MsgA if UL grant is not received in MsgB. In 4 step RACH procedure, if TAT timer is running, the received TA command is ignored. In an embodiment, in case of 2 step RACH procedure irrespective of TAT timer is running or not, UE applies the received TA command.

Method 5:

UE is in RRC_CONNECTED and 2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE is in RRC_CONNECTED and hence it includes at least C-RNTI in MsgA payload. Other information (e.g., BSR, PHR, etc.) if available can be included according to logical channel prioritization.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s).

7. Criteria for successful contention resolution and 2 step RA procedure completion in case C-RNTI was included in MsgA If TAT is running and UE receives MsgB including its C-RNTI, contention resolution is successful and 2 step RA procedure is completed successfully. Note that there can be one or more timing advanced groups in the UE. Timing advanced group is a group of serving cells that is configured by RRC and that, for the cells with a UL configured, uses the same timing reference cell and the same timing advance value. A timing advance group containing the SpCell of a MAC entity is referred to as PTAG, whereas the term STAG refers to other TAGs. TAT is maintained separately for each TAG. So the TAT in this operation corresponds to the TAG of the cell on which MsgA is transmitted. If 2 step RA procedure is supported only for SpCell, TAT corresponds to the PTAG. The received absolute timing advance command is applied to TAG of the cell on which MsgA is transmitted. If 2 step RA procedure is supported only for SpCell, absolute timing advance command is applied to the PTAG.

Else if TAT is not running and UE receives MsgB including its C-RNTI and it includes absolute TA command, contention resolution is successful and 2 step RA procedure is completed successfully.

Absolute timing advance command [11, TS 38.321], $T_A$, for a TAG indicates $N_{TA}$ values by index values of $T_A=0, 1, 2, \ldots, 3846$, where an amount of the time alignment for the TAG with SCS of $2^\mu \cdot 15$ kHz is $N_{TA}=T_A \cdot 16 \cdot 64/2^\mu$. $N_{TA}$ is defined in [4, TS 38.211].

8. SCS for TA Command: In case of 2 step RACH procedure, $N_{TA}$ is relative to the SCS of the first uplink transmission from the UE after the reception of the MsgB. In another embodiment, it is relative to the SCS of the PUSCH in MsgA. In another embodiment, it is relative to the SCS of the first uplink transmission if UL grant is received in MsgB/Msg2, and it is relative to the SCS of the PUSCH in MsgA if UL grant is not received in MsgB. In 4 step RACH procedure, if TAT timer is running, the received TA command is ignored. In an embodiment, in case of 2 step RACH procedure irrespective of TAT timer is running or not, UE applies the received TA command.

Method 6:
UE is in RRC_CONNECTED and 2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE is in RRC_CONNECTED and hence it includes at least C-RNTI in MsgA payload. Other information (e.g., BSR, PHR, etc.) if available can be included according to logical channel prioritization.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s).

7. Criteria for successful contention resolution and 2 step RA procedure completion in case C-RNTI was included in MsgA If UE receives MsgB including its C-RNTI and it includes absolute TA command, contention resolution is successful and 2 step RA procedure is completed successfully. The received absolute timing advance command is applied to TAG of the cell on which MsgA is transmitted. If 2 step RA procedure is supported only for SpCell, absolute timing advance command is applied to the PTAG.

Absolute timing advance command [11, TS 38.321], $T_A$, for a TAG indicates $N_{TA}$ values by index values of $T_A$=0, 1, 2, . . . , 3846, where an amount of the time alignment for the TAG with SCS of $2^\mu \cdot 15$ kHz is $N_{TA}=T_A \cdot 16 \cdot 64/2^\mu$. $N_{TA}$ is defined in [4, TS 38.211].

8. SCS for TA Command: In case of 2 step RACH procedure, $N_{TA}$ is relative to the SCS of the first uplink transmission from the UE after the reception of the MsgB. In another embodiment, it is relative to the SCS of the PUSCH in MsgA. In another embodiment, it is relative to the SCS of the first uplink transmission if UL grant is received in MsgB/Msg2, and it is relative to the SCS of the PUSCH in MsgA if UL grant is not received in MsgB. In 4 step RACH procedure, if TAT timer is running, the received TA command is ignored. In an embodiment, in case of 2 step RACH procedure irrespective of TAT timer is running or not, UE applies the received TA command.

II. HARQ Feedback for MsgB 2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE generates MsgA payload.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s).

7. If UE receives MsgB and contention resolution is successful upon receiving the MsgB, UE transmits HARQ ACK for the TB in which this MsgB was received.

For 2 step RACH procedure, physical downlink shared channel (PDSCH) HARQ feedback timing indicator is included in the PDCCH addressed to RA-RNTI (or RNTI for MsgB reception). Alternately, HARQ feedback timing indicator can be included in MsgB. PDSCH HARQ feedback timing indicator is an index to an entry in list of K1 values which is configured by RRC. If PDSCH for MsgB ends in slot 'n', UE transmits HARQ ACK in slot 'n+K1'. For 4 step RACH procedure, PDSCH HARQ feedback timing indicator is not included in the PDCCH addressed to RA-RNTI.

8. If UE receives MsgB and contention resolution is not successful upon receiving the MsgB, UE does not transmit HARQ ACK for the TB in which this MsgB was received.

III. Switching from 2 Step RA to 4 Step RA Procedure

It is proposed that network can direct UE(s) performing 2 step RACH procedure to switch to 4 step RACH procedure in case of congestion on 2 step RACH resources. gNB can signal a pre-defined backoff index or a separate indication in MsgB to direct the UE(s) performing 2 step RACH procedure to switch to 4 step RACH procedure, i.e., UE only (re-) transmits the PRACH preamble for the remaining RACH procedure.

Method 1:

2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE generates MsgA payload.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s) (e.g., RA-RNTI (or RNTI for MsgB reception), C-RNTI).

7. Network controlled switching: In this method, gNB can signal a pre-defined backoff index in MsgB to direct the UE(s) performing 2 step RACH procedure to switch to 4 step RACH procedure.

Figure 6:
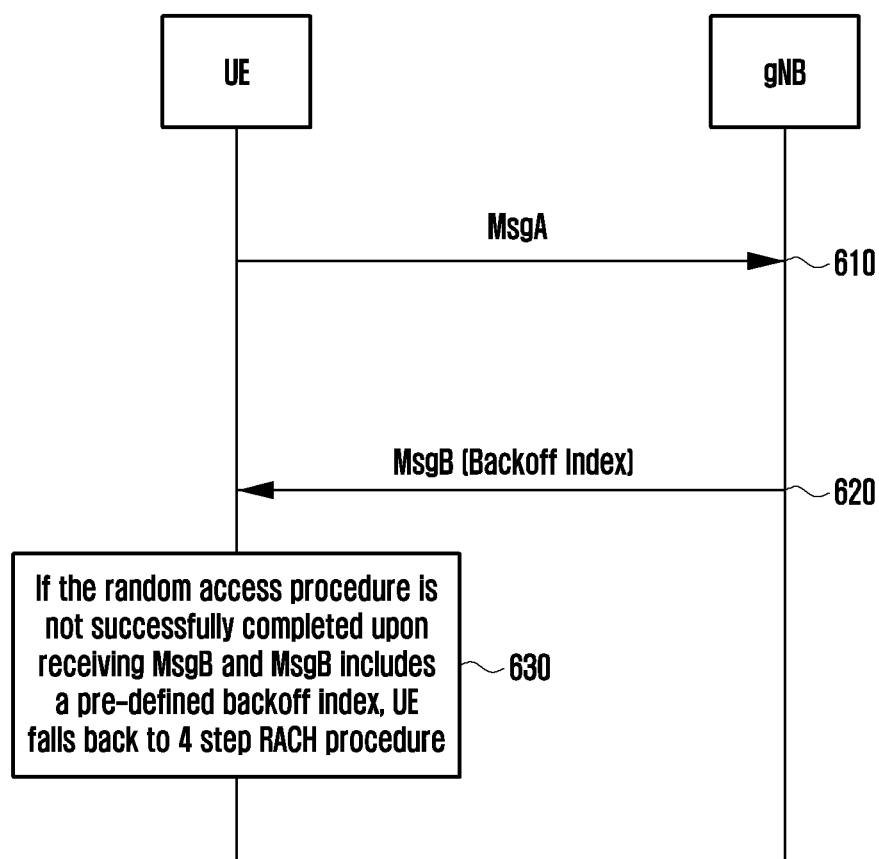
FIG. 6 shows signaling flows between a UE and a gNB for switching from 2 step RA procedure to 4 step RACH procedure according to an embodiment of the disclosure.

FIG. 6 shows signaling flows between a UE and a gNB for switching from 2 step RA procedure to 4 step RACH procedure according to an embodiment of the disclosure.

Referring to FIG. 6, the UE transmits MsgA to the gNB at operation 610. In response, the gNB transmits MsgB to the UE at operation 620. Upon receiving MsgB, if the RA procedure is not successfully completed and the received MsgB includes a pre-defined backoff index, UE switches to 4 step RACH procedure, i.e., UE (re-) transmits the PRACH preamble (i.e., Msg1) at operation 630.

In one embodiment, UE selects a random backoff time according to a uniform distribution between 0 and the default back off value. The default back off value can be pre-defined or signaled by gNB in system information or dedicated RRC signaling. In an embodiment, default backoff value can be the backoff value corresponding to backoff index=pre-defined backoff index−1. In another embodiment, default backoff value can be the backoff value corresponding to backoff index=pre-defined backoff index. Note that backoff values for various backoff indexes are pre-defined. After the back off time UE switches to 4 step RACH procedure.

In another embodiment, gNB may signal two backoff indexes in MsgB. One backoff index is set to a pre-defined backoff index. Another backoff index is set to a non-predefined backoff index. UE selects a random backoff time according to a uniform distribution between 0 and the back off value corresponding to the non pre-defined backoff index. After the back off time, UE switches to 4 step RACH procedure as MsgB includes the pre-defined backoff index.

8. Handling counters upon switching: Upon initiation of RA procedure, UE sets the PREAMBLE_TRANSMISSION_COUNTER and PREAMBLE_POWER_RAMPING_COUNTER to 1. For each subsequent MsgA transmission (PRACH preamble and PUSCH (i.e. MsgA payload)), UE increments PREAMBLE_TRANSMISSION_ COUNTER. For each subsequent MsgA transmission, PREAMBLE_POWER_RAMPING_COUNTER is increments if all of the following conditions are met: if the notification of suspending power ramping counter has not been received from lower layers; and if listen before talk (LBT) failure indication was not received from lower layers for the last RA preamble transmission; and if SSB or CSI-RS selected is not changed from the selection in the last RA preamble transmission.

Upon switching to 4 step RACH procedure (based on above procedure (as in FIG. 6) or any other trigger), UE handles the PREAMBLE_TRANSMISSION_COUNTER & PREAMBLE_POWER_RAMPING_COUNTER as follows:

Option 1: UE resets the counters, i.e., it sets PREAMBLE_TRANSMISSION_COUNTER and PREAMBLE_POWER_RAMPING_COUNTER to 1.

Option 2: UE does not reset PREAMBLE_TRANSMISSION_COUNTER and PREAMBLE_POWER_RAMPING_COUNTER. For example, before switching, if PREAMBLE_TRANSMISSION_COUNTER corresponding to last MsgA transmission was X, PREAMBLE_TRANSMISSION_COUNTER for $1^{st}$ Msg1 transmission in 4 step RACH procedure is X+1. For example, before switching, if PREAMBLE_POWER_RAMPING_COUNTER corresponding to last MsgA transmission was Y, PREAMBLE_POWER_RAMPING_COUNTER for $1^{st}$ Msg1 transmission in 4 step RACH procedure is:

Y+1, if the notification of suspending power ramping counter has not been received from lower layers; and if LBT failure indication was not received from lower layers for the last RA preamble transmission; and if SSB or CSI-RS selected is not changed from the selection in the last RA preamble transmission. Otherwise, it is Y.

Option 3: UE resets PREAMBLE_POWER_RAMPING_COUNTER. UE does not reset PREAMBLE_TRANSMISSION_COUNTER.

In one embodiment, option to select can be indicated by network in system information or dedicated RRC signaling or in MsgB.

In one embodiment, multiple backoff indexes can be pre-defined. Each of these pre-defined backoff indexes can be mapped to one of the options listed above.

Note that in all the options (option 1/2/3), UE will apply 4 step RACH configuration (power step, received target power, RA response (RAR) window size, etc.) upon switching to 4 step RACH procedure.

9. Preamble group selection upon switching: If UE is performing 4 step RA procedure as a result of fallback/switching from 2 step RA procedure, UE shall not perform preamble group reselection for Msg1 transmission. UE uses the same preamble group as selected during 2 step RA procedure. This will enable UE to transmit MsgA payload as Msg3 during the 4 step RA procedure.

10. UL carrier upon switching: If MsgA was transmitted on supplementary UL (SUL) and SUL does not support 4 step RA procedure, UE uses UL upon switching to 4 step RA procedure. If MsgA was transmitted on UL and UL does not support 4 step RA procedure, UE uses SUL upon switching to 4 step RA procedure. In an embodiment, if MsgA was transmitted on SUL and SUL does not support 4 step RA procedure, UE does not switch to 4 step RA procedure. In an embodiment, if MsgA was transmitted on UL and UL does not support 4 step RA procedure, UE does not switch to 4 step RA procedure.

Method 2:

2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE generates MsgA payload.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s) (e.g., RA-RNTI (or RNTI for MsgB reception), C-RNTI).

7. Network controlled switching: In this method, gNB can signal a pre-defined backoff index in MsgB to direct the UE(s) performing 2 step RACH procedure to switch to 4 step RACH procedure.

Figure 7:
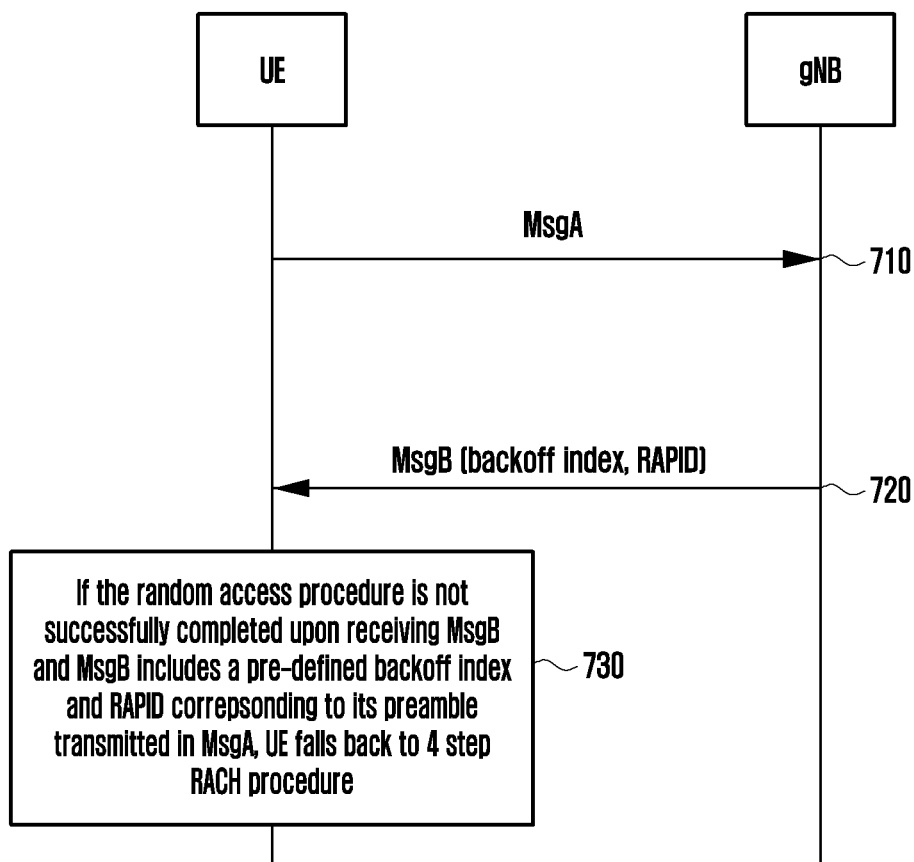
FIG. 7 shows signaling flows between a UE and a gNB for switching from 2 step RA procedure to 4 step RACH procedure according to an embodiment of the disclosure.

FIG. 7 shows signaling flows between a UE and a gNB for switching from 2 step RA procedure to 4 step RACH procedure according to an embodiment of the disclosure.

Referring to FIG. 7, the UE transmits MsgA to the gNB at operation 710. In response, the gNB transmits MsgB to the UE at operation 720. Upon receiving MsgB, if the RA procedure is not successfully completed and the received MsgB includes a pre-defined backoff index and a random access preamble identifier (RAPID) corresponding to PRACH preambles transmitted by UE in MsgA, UE switches to 4 step RACH procedure, i.e., UE (re-) transmits the PRACH preamble (i.e., Msg1) at operation 730.

In one embodiment, UE selects a random backoff time according to a uniform distribution between 0 and the default back off value. The default back off value can be pre-defined or signaled by gNB in system information or dedicated RRC signaling. In an embodiment, default backoff value can be the backoff value corresponding to backoff index=pre-defined backoff index−1. In another embodiment, default backoff value can be the backoff value corresponding to backoff index=pre-defined backoff index. Note that backoff values for various backoff indexes are pre-defined. After the back off time, UE switches to 4 step RACH procedure.

In another embodiment, gNB may signal two backoff indexes in MsgB. One backoff index is set to a pre-defined backoff index. Another backoff index is set to a non pre-defined backoff index. UE selects a random backoff time according to a uniform distribution between 0 and the back off value corresponding to the non pre-defined backoff index. After the back off time, UE switches to 4 step RACH procedure as MsgB includes the pre-defined backoff index.

8. Handling counters upon switching: Upon initiation of RA procedure, UE sets the PREAMBLE_TRANSMISSION_COUNTER and PREAMBLE_POWER_RAMPING_COUNTER to 1. For each subsequent MsgA transmission (PRACH preamble and PUSCH (i.e. MsgA payload)), UE increments PREAMBLE_TRANSMISSION_COUNTER. For each subsequent MsgA transmission, PREAMBLE_POWER_RAMPING_COUNTER is increments if all of the following conditions are met: if the notification of suspending power ramping counter has not been received from lower layers; and if LBT failure indication was not received from lower layers for the last RA preamble transmission; and if SSB or CSI-RS selected is not changed from the selection in the last RA preamble transmission.

Upon switching to 4 step RACH procedure (based on above procedure (as in FIG. 6) or any other trigger), UE handles the PREAMBLE_TRANSMISSION_COUNTER & PREAMBLE_POWER_RAMPING_COUNTER as follows:

Option 1: UE resets the counters, i.e., it sets PREAMBLE_TRANSMISSION_COUNTER and PREAMBLE_POWER_RAMPING_COUNTER to 1.

Option 2: UE does not reset PREAMBLE_TRANSMISSION_COUNTER and PREAMBLE_POWER_RAMPING_COUNTER. For example, before switching, if PREAMBLE_TRANSMISSION_COUNTER corresponding to last MsgA transmission was X, PREAMBLE_TRANSMISSION_COUNTER for $1^{st}$ Msg1 transmission in 4 step RACH procedure is X+1. For example, before switching, if PREAMBLE_POWER_RAMPING_COUNTER corresponding to last MsgA transmission was Y, PREAMBLE_POWER_RAMPING_COUNTER for $1^{st}$ Msg1 transmission in 4 step RACH procedure is:

Y+1, if the notification of suspending power ramping counter has not been received from lower layers; and if LBT failure indication was not received from lower layers for the last RA preamble transmission; and if SSB or CSI-RS selected is not changed from the selection in the last RA preamble transmission. Otherwise, it is Y.

Option 3: UE resets PREAMBLE_POWER_RAMPING_COUNTER. UE does not reset PREAMBLE_TRANSMISSION_COUNTER.

In one embodiment, option to select can be indicated by network in system information or dedicated RRC signaling or in MsgB.

In one embodiment, multiple backoff indexes can be pre-defined. Each of these pre-defined backoff indexes can be mapped to one of the options listed above.

Note that in all the options (option 1/2/3), UE will apply 4 step RACH configuration (power step, received target power, RAR window size, etc.) upon switching to 4 step RACH procedure.

9. Preamble group selection upon switching: If UE is performing 4 step RA procedure as a result of fallback/switching from 2 step RA procedure, UE shall not perform preamble group reselection for Msg1 transmission. UE uses the same preamble group as selected during 2 step RA procedure. This will enable UE to transmit MsgA payload as Msg3 during the 4 step RA procedure.

10. UL carrier upon switching: If MsgA was transmitted on SUL and SUL does not support 4 step RA procedure, UE uses UL upon switching to 4 step RA procedure. If MsgA was transmitted on UL and UL does not support 4 step RA procedure, UE uses SUL upon switching to 4 step RA procedure. In an embodiment, if MsgA was transmitted on SUL and SUL does not support 4 step RA procedure, UE does not switch to 4 step RA procedure. In an embodiment, if MsgA was transmitted on UL and UL does not support 4 step RA procedure, UE does not switch to 4 step RA procedure.

Method 3:

2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE generates MsgA payload.

5. UE then transmits MsgA (i.e., the selected PRACH preamble is transmitted in the selected PRACH occasion. MsgA payload is transmitted in the selected PUSCH resource.)

6. After transmitting MsgA, ra-ResponseWindow for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s) (e.g., RA-RNTI (or RNTI for MsgB reception), C-RNTI).

7. Network controlled switching: In this method, gNB can signal a switching indication in MsgB to direct the UE(s) performing 2 step RACH procedure to switch to 4 step RACH procedure.

Figure 8:
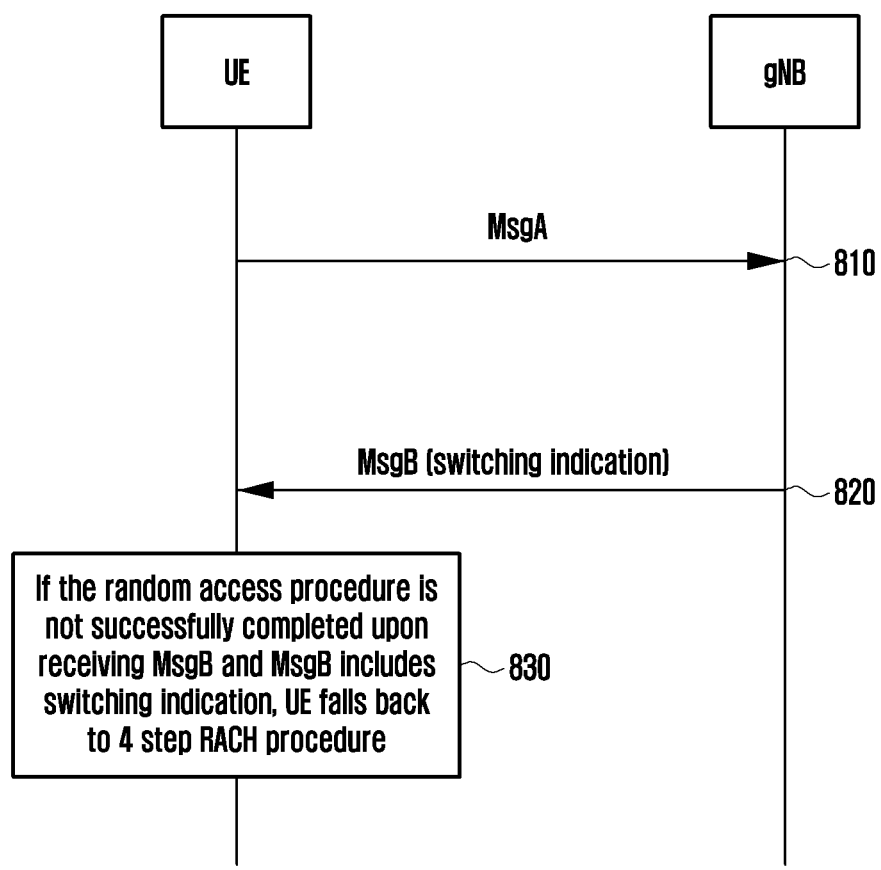
FIG. 8 shows signaling flows between a UE and a gNB for switching from 2 step RA procedure to 4 step RACH procedure according to an embodiment of the disclosure.

FIG. 8 shows signaling flows between a UE and a gNB for switching from 2 step RA procedure to 4 step RACH procedure according to an embodiment of the disclosure.

Referring to FIG. 8, the UE transmits MsgA to the gNB at operation 810. In response, the gNB transmits MsgB to the UE at operation 820. Upon receiving MsgB, if the RA procedure is not successfully completed and the received MsgB includes a switching indication, UE switches to 4 step RACH procedure, i.e., UE (re-) transmits the PRACH preamble (i.e., Msg1) at operation 830.

In one embodiment, UE selects a random backoff time according to a uniform distribution between 0 and the default back off value. The default back off value can be pre-defined or signaled by gNB in system information or dedicated RRC signaling. After the back off time, UE switches to 4 step RACH procedure.

In another embodiment, gNB may signal both a backoff index and a switching indication in MsgB. UE selects a random backoff time according to a uniform distribution between 0 and the back off value corresponding to the backoff index. After the back off time, UE switches to 4 step RACH procedure as MsgB includes the switching indication.

8. Handling counters upon switching: Upon initiation of RA procedure, UE sets the PREAMBLE_TRANSMISSION_COUNTER and PREAMBLE_POWER_RAMPING_COUNTER to 1. For each subsequent MsgA transmission (PRACH preamble and PUSCH (i.e. MsgA payload)), UE increments PREAMBLE_TRANSMISSION_ COUNTER. For each subsequent MsgA transmission, PREAMBLE_POWER_RAMPING_COUNTER is increments if all of the following conditions are met: if the notification of suspending power ramping counter has not been received from lower layers; and if LBT failure indication was not received from lower layers for the last RA preamble transmission; and if SSB or CSI-RS selected is not changed from the selection in the last RA preamble transmission.

Upon switching to 4 step RACH procedure (based on above procedure (as in FIG. 6) or any other trigger), UE handles the PREAMBLE_TRANSMISSION_COUNTER & PREAMBLE_POWER_RAMPING_COUNTER as follows:

Option 1: UE resets the counters, i.e., it sets PREAMBLE_TRANSMISSION_COUNTER and PREAMBLE_POWER_RAMPING_COUNTER to 1.

Option 2: UE does not reset PREAMBLE_TRANSMISSION_COUNTER and PREAMBLE_POWER_RAMPING_COUNTER. For example, before switching, if PREAMBLE_TRANSMISSION_COUNTER corresponding to last MsgA transmission was X, PREAMBLE_TRANSMISSION_COUNTER for $1^{st}$ Msg1 transmission in 4 step RACH procedure is X+1. For example, before switching, if PREAMBLE_POWER_RAMPING_COUNTER corresponding to last MsgA transmission was Y, PREAMBLE_POWER_RAMPING_COUNTER for $1^{st}$ Msg1 transmission in 4 step RACH procedure is:

Y+1, if the notification of suspending power ramping counter has not been received from lower layers; and if LBT failure indication was not received from lower layers for the last RA preamble transmission; and if SSB or CSI-RS selected is not changed from the selection in the last RA preamble transmission. Otherwise, it is Y.

Option 3: UE resets PREAMBLE_POWER_RAMPING_COUNTER. UE does not reset PREAMBLE_TRANSMISSION_COUNTER.

In one embodiment, option to select can be indicated by network in system information or dedicated RRC signaling or in MsgB.

In one embodiment, a switching indication comprises of multiple bits. Each of the switching indication values can be mapped to one of the options listed above. For example, switching indication 0 can indicate option 1, switching indication 1 can indicate option 2, and switching indication can indicate option 3.

Note that in all the options (option 1/2/3), UE will apply 4 step RACH configuration (power step, received target power, RAR window size, etc.) upon switching to 4 step RACH procedure.

9. Preamble group selection upon switching: If UE is performing 4 step RA procedure as a result of fallback/switching from 2 step RA procedure, UE shall not perform preamble group reselection for Msg1 transmission. UE uses the same preamble group as selected during 2 step RA procedure. This will enable UE to transmit MsgA payload as Msg3 during the 4 step RA procedure.

10. UL carrier upon switching: If MsgA was transmitted on SUL and SUL does not support 4 step RA procedure, UE uses UL upon switching to 4 step RA procedure. If MsgA was transmitted on UL and UL does not support 4 step RA procedure, UE uses SUL upon switching to 4 step RA procedure. In an embodiment, if MsgA was transmitted on SUL and SUL does not support 4 step RA procedure, UE does not switch to 4 step RA procedure. In an embodiment, if MsgA was transmitted on UL and UL does not support 4 step RA procedure, UE does not switch to 4 step RA procedure.

Method 4:

2 step RACH procedure is initiated. RACH procedure can be initiated by UE (e.g., for SR or upon receiving reconfiguration with sync from gNB) or it can be initiated by network (e.g., by sending the PDCCH order).

1. UE first selects a suitable SSB where an SSB is suitable if SS-RSRP of that SSB is above rsrp-ThresholdSSB. Selection of a suitable SSB among multiple suitable SSBs is up to UE implementation. If a suitable SSB is not available, UE can select any SSB. It is to be noted the in case of CSI-RS based RACH procedure, UE will select CSI-RS in similar manner as SSB.

In 2 step RACH procedure, gNB needs to transmit MsgB upon receiving MsgA. In order to enable gNB to avoid transmission of MsgB in directions (or coverage) of all SSBs/CSI-RSs, SSB/CSI-RS is selected by UE.

2. RA Preamble and PRACH occasion selection gNB identifies the SSB/CSI-RS from the received MsgA and then transmits MsgB in the direction of the identified SSB/CSI-RS. In case gNB is able to receive PRACH preamble part of MsgA but fails to receive MsgA payload, it can still transmit MsgB (or Msg2) including information to fallback to 4 step RACH procedure. So, gNB should be able to determine the SSB/CSI-RS information from PRACH preamble part of MsgA instead of MsgA payload. To enable this, PRACH preambles and PRACH occasions in 2 step RACH procedure are mapped to SSBs/CSI-RSs. The information (such as number of SSBs mapped per RACH occasion, number of preambles per SSB) about the mapping is signaled by gNB in RACH configuration.

UE selects the preamble group. If RA preambles group B is configured, UE selects RA preambles group A or group B based on MsgA payload size or based on MsgA payload size and path loss. If the potential MsgA size (UL data available for transmission plus MAC header and, where required, MAC CEs) is greater than ra-Msg3SizeGroupA (or ra-MsgASizeGroupA) and the pathloss is less than PCMAX (of the serving cell performing the RA procedure)-preambleReceivedTargetPower-msg3-DeltaPreamble (msgA-DeltaPreamble)-messagePowerOffsetGroupB; or if the RA procedure was initiated for the CCCH logical channel and the CCCH SDU size plus MAC subheader is greater than ra-Msg3SizeGroupA: the UE selects the RA preambles group B. Otherwise, the UE selects the RA preambles group A. If RA preambles group B is not configured, UE selects RA preambles group A.

UE selects an RA preamble randomly with equal probability from the RA preambles associated with the selected SSB and the selected RA preambles group.

UE selects the next available PRACH occasion from the PRACH occasions corresponding to the selected SSB.

3. PUSCH Resource selection

UE selects the PUSCH resource. If there is a one to one mapping between preambles in a PRACH occasion and associated PUSCH resources, UE selects the PUSCH resource corresponding to the selected PRACH preamble. If there is a many to one mapping between preambles in a PRACH occasion and associated PUSCH resources, UE selects the PUSCH resource corresponding to the selected PRACH preamble. Note that if there are multiple PUSCH resource pools wherein the PUSCH resource in different pool carries different MsgA payload size, UE selects the PUSCH resource from PUSCH resource pool corresponding to MsgA payload size.

4. UE generates MsgA payload.

5. UE then transmits MsgA (i.e., the selected PRACH preamble is transmitted in the selected PRACH occasion. MsgA payload is transmitted in the selected PUSCH resource.)

6. After transmitting MsgA, ra-Response Window for MsgB reception is started by UE at the first PDCCH occasion for MsgB reception that is at least one symbol away from the end of PUSCH in MsgA. ra-ResponseWindow should be started as early as possible to enable the gNB to transmit fallback information quickly in case gNB has received the PRACH preamble part of MsgA but fails to decode the PUSCH part of MsgA. A large ra-ResponseWindow can be configured to enable gNB enough processing time for transmitting MsgB corresponding to successfully received MsgA.

UE monitors for PDCCH addressed to one or more RNTI(s) (e.g., RA-RNTI (or RNTI for MsgB reception), C-RNTI).

7. Network controlled switching: In this method, gNB can signal a switching indication in MsgB to direct the UE(s) performing 2 step RACH procedure to switch to 4 step RACH procedure.

Figure 9:
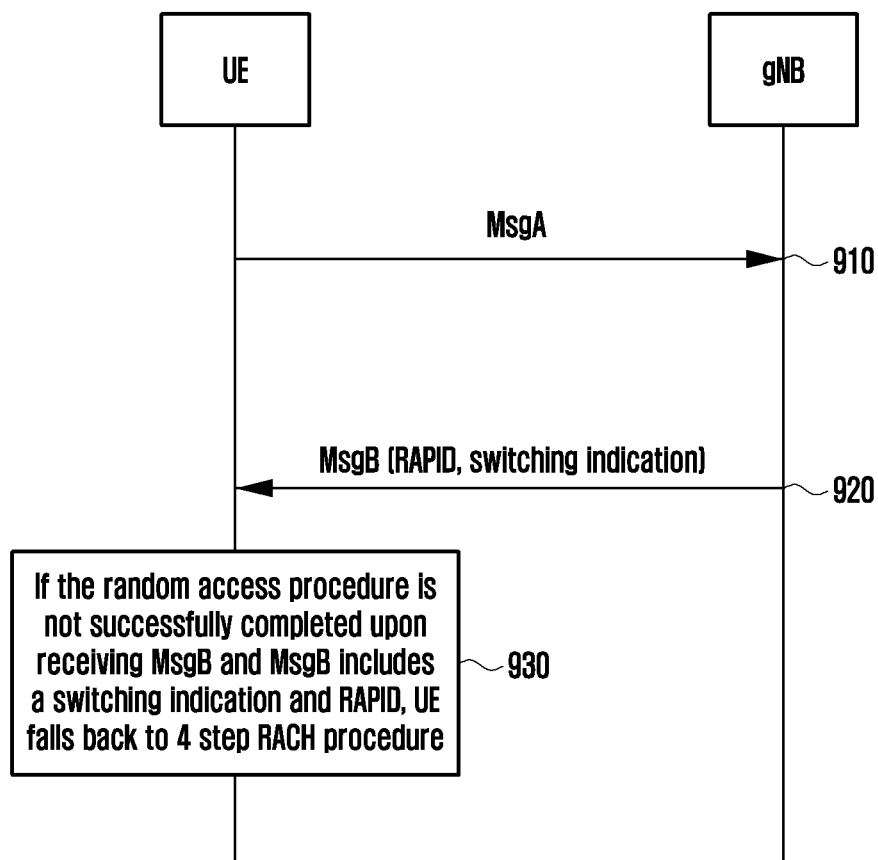
FIG. 9 shows signaling flows between a UE and a gNB for switching from 2 step RA procedure to 4 step RACH procedure according to an embodiment of the disclosure.

FIG. 9 shows signaling flows between a UE and a gNB for switching from 2 step RA procedure to 4 step RACH procedure according to an embodiment of the disclosure.

Referring to FIG. 9, the UE transmits MsgA to the gNB at operation 910. In response, the gNB transmits MsgB to the UE at operation 920. Upon receiving MsgB, if the RA procedure is not successfully completed and the received MsgB includes a switching indication and a RAPID corresponding to PRACH preambles transmitted by UE in MsgA, UE switches to 4 step RACH procedure, i.e., UE (re-) transmits the PRACH preamble (i.e., Msg1) at operation 930.

In one embodiment, UE selects a random backoff time according to a uniform distribution between 0 and the default back off value. The default back off value can be pre-defined or signaled by gNB in system information or dedicated RRC signaling. After the back off time, UE switches to 4 step RACH procedure.

In another embodiment, gNB may signal both a backoff index and a switching indication in MsgB. UE selects a random backoff time according to a uniform distribution between 0 and the back off value corresponding to the backoff index. After the back off time, UE switches to 4 step RACH procedure as MsgB includes the switching indication.

8. Handling counters upon switching: Upon initiation of RA procedure, UE sets the PREAMBLE_TRANSMISSION_COUNTER and PREAMBLE_POWER_RAMPING_COUNTER to 1. For each subsequent MsgA transmission (PRACH preamble and PUSCH (i.e. MsgA payload)), UE increments PREAMBLE_TRANSMISSION_ COUNTER. For each subsequent MsgA transmission, PREAMBLE_POWER_RAMPING_COUNTER is increments if all of the following conditions are met: if the notification of suspending power ramping counter has not been received from lower layers; and if LBT failure indication was not received from lower layers for the last RA preamble transmission; and if SSB or CSI-RS selected is not changed from the selection in the last RA preamble transmission.

Upon switching to 4 step RACH procedure (based on above procedure (as in FIG. 6) or any other trigger), UE handles the PREAMBLE_TRANSMISSION_COUNTER & PREAMBLE_POWER_RAMPING_COUNTER as follows:

Option 1: UE resets the counters, i.e., it sets PREAMBLE_TRANSMISSION_COUNTER and PREAMBLE_POWER_RAMPING_COUNTER to 1.

Option 2: UE does not reset PREAMBLE_TRANSMISSION_COUNTER and PREAMBLE_POWER_RAMPING_COUNTER. For example, before switching, if PREAMBLE_TRANSMISSION_COUNTER corresponding to last MsgA transmission was X, PREAMBLE_TRANSMISSION_COUNTER for $1^{st}$ Msg1 transmission in 4 step RACH procedure is X+1. For example, before switching, if PREAMBLE_POWER_RAMPING_COUNTER corresponding to last MsgA transmission was Y, PREAMBLE_

POWER_RAMPING_COUNTER for $1^{st}$ Msg1 transmission in 4 step RACH procedure is:

Y+1, if the notification of suspending power ramping counter has not been received from lower layers; and if LBT failure indication was not received from lower layers for the last RA preamble transmission; and if SSB or CSI-RS selected is not changed from the selection in the last RA preamble transmission. Otherwise, it is Y.

Option 3: UE resets PREAMBLE_POWER_RAMPING_COUNTER. UE does not reset PREAMBLE_TRANSMISSION_COUNTER.

In one embodiment, option to select can be indicated by network in system information or dedicated RRC signaling or in MsgB.

In one embodiment, a switching indication comprises of multiple bits. Each of the switching indication values can be mapped to one of the options listed above. For example, switching indication 0 can indicate option 1, switching indication 1 can indicate option 2, and switching indication can indicate option 3.

Note that in all the options (option 1/2/3), UE will apply 4 step RACH configuration (power step, received target power, RAR window size, etc.) upon switching to 4 step RACH procedure.

9. Preamble group selection upon switching: If UE is performing 4 step RA procedure as a result of fallback/switching from 2 step RA procedure, UE shall not perform preamble group reselection for Msg1 transmission. UE uses the same preamble group as selected during 2 step RA procedure. This will enable UE to transmit MsgA payload as Msg3 during the 4 step RA procedure.

10. UL carrier upon switching: If MsgA was transmitted on SUL and SUL does not support 4 step RA procedure, UE uses UL upon switching to 4 step RA procedure. If MsgA was transmitted on UL and UL does not support 4 step RA procedure, UE uses SUL upon switching to 4 step RA procedure. In an embodiment, if MsgA was transmitted on SUL and SUL does not support 4 step RA procedure, UE does not switch to 4 step RA procedure. In an embodiment, if MsgA was transmitted on UL and UL does not support 4 step RA procedure, UE does not switch to 4 step RA procedure.

In an embodiment, network can transmit a switching indication and/or a pre-defined backoff index in Msg2 to switch from 4 step RACH procedure to 2 step RACH procedure. The above procedure can be re-used by simply interchanging MsgA by Msg1 and MsgB by Msg2 and 4 step by 2 step.

Figure 10:
FIG. 10 is a block diagram of a terminal according to an embodiment of the disclosure.

FIG. 10 is a block diagram of a terminal according to an embodiment of the disclosure.

Referring to FIG. 10, a terminal includes a transceiver 1010, a controller 1020 and a memory 1030. The controller 1020 may refer to a circuitry, an ASIC, an FPGA, or at least one processor. The transceiver 1010, the controller 1020 and the memory 1030 are configured to perform the operations of the UE illustrated in the figures, e.g., FIGS. 1 to 9, or as otherwise described above. Although the transceiver 1010, the controller 1020 and the memory 1030 are shown as separate entities, they may be integrated onto a single chip. The transceiver 1010, the controller 1020 and the memory 1030 may also be electrically connected to or coupled with each other.

The transceiver 1010 may transmit and receive signals to and from other network entities, e.g., a base station.

The controller 1020 may control the UE to perform functions according to the embodiments described above. For example, the controller 1020 is configured to perform a 2 step RA procedure, i.e., the controller 1020 is configured to control the transceiver 1010 to transmit a MsgA including an RA preamble and a C-RNTI MAC CE, and to receive a MsgB on a PDCCH addressed to the C-RNTI. The controller 1020 is configured to identify whether a TAT is running or not. If the TAT is running and the PDCCH contains a UL grant for a new transmission, the controller 1020 is configured to determine this 2 step RA procedure successfully completed. Else (i.e., if the TAT is not running), if a downlink assignment has been received on the PDCCH and the MAC PDU contains the absolute TA command MAC CE, the controller 1020 is configured to determine this 2 step RA procedure successfully completed. In addition, the controller 1020 is configured to control the transceiver 1010 to transmit an HARQ ACK for the TB in which the MsgB was received if the 2 step RA procedure is successfully completed, and not to transmit an HARQ ACK for the TB in which the MsgB was received if the RA procedure is not yet successfully completed. Furthermore, the controller 1020 is configured to determine to switch from the 2 step RA procedure to a 4 step RA procedure, i.e., only (re-) transmits an RA preamble for the remaining RACH procedure, if the 2 step RA procedure is not successfully completed even after transmitting MsgA 'N' times. Upon performing the 4 step RA procedure as a result of fallback/switching from the 2 step RA procedure, the controller 1020 is configured to select the same group of RA preambles as was selected for the 2 step RA procedure and to maintain PREAMBLE_TRANSMISSION_COUNTER and PREAMBLE_POWER_RAMPING_COUNTER for switching from the 2 step RA procedure to the 4 step RA procedure.

In an embodiment, the operations of the terminal may be implemented using the memory 1030 storing corresponding program codes. Specifically, the terminal may be equipped with the memory 1030 to store program codes implementing desired operations. To perform the desired operations, the controller 1020 may read and execute the program codes stored in the memory 1030 by using a processor or a central processing unit (CPU).

Figure 11:
FIG. 11 is a block diagram of a base station according to an embodiment of the disclosure.

FIG. 11 is a block diagram of a base station according to an embodiment of the disclosure.

Referring to FIG. 11, a base station includes a transceiver 1110, a controller 1120 and a memory 1130. The controller 1120 may refer to a circuitry, an ASIC, an FPGA, or at least one processor. The transceiver 1110, the controller 1120 and the memory 1130 are configured to perform the operations of the gNB illustrated in the figures, e.g., FIGS. 1 to 9, or as otherwise described above. Although the transceiver 1110, the controller 1120 and the memory 1130 are shown as separate entities, they may be integrated onto a single chip. The transceiver 1110, the controller 1120 and the memory 1130 may also be electrically connected to or coupled with each other.

The transceiver 1110 may transmit and receive signals to and from other network entities, e.g., a terminal.

The controller 1120 may control the gNB to perform functions according to the embodiments described above. For example, the controller 1120 is configured to perform a 2 step RA procedure, i.e., the controller 1120 controls the transceiver 1110 to receive a MsgA including an RA preamble and a C-RNTI MAC CE, and to transmit a MsgB on a PDCCH addressed to the C-RNTI. This 2 step RA procedure is considered successfully completed if the TAT of the UE is running and the PDCCH contains a UL grant for a new transmission; or if the TAT of the UE is not running, and a downlink assignment has been transmitted on the PDCCH, and the MAC PDU contains the absolute TA command MAC CE. The controller 1220 is configured to control the transceiver 1210 to receive an HARQ ACK for the TB in which the MsgB was received.

In an embodiment, the operations of the base station may be implemented using the memory 1130 storing corresponding program codes. Specifically, the base station may be equipped with the memory 1130 to store program codes implementing desired operations. To perform the desired operations, the controller 1120 may read and execute the program codes stored in the memory 1130 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    transmitting, to a base station, a random access (RA) preamble of a message A (MsgA) for a 2 step RA procedure on a physical RA channel (PRACH);
    transmitting, to the base station, a payload of the MsgA for the 2 step RA procedure on a physical uplink shared channel (PUSCH), the payload including a cell-radio network temporary identifier (C-RNTI);
    receiving, from the base station, a physical downlink control channel (PDCCH) addressed to the C-RNTI included in the payload of the MsgA;
    identifying that the 2 step RA procedure is successfully completed, in case that a time alignment timer (TAT) is running and the PDCCH schedules an uplink resource for a new transmission; and
    identifying that the 2 step RA procedure is successfully completed, in case that the TAT is not running, the PDCCH schedules a downlink resource, and a timing advance (TA) command is received based on the downlink resource.

2. The method of claim 1, further comprising:
    determining to switch from the 2 step RA procedure to a 4 step RA procedure, in case that the 2 step RA procedure is not successfully completed and a number of transmitting the MsgA reaches to a specific value.

3. The method of claim 2, further comprising:
    selecting a same group of RA preambles as the 2 step RA procedure.

4. The method of claim 2,
    wherein a preamble transmission counter associated with the number of transmitting the MsgA, and a preamble power ramping counter associated with a transmission of the MsgA are maintained.

5. A method performed by a base station in a wireless communication system, the method comprising:
    receiving, from a terminal, a random access (RA) preamble of a message A (MsgA) for a 2 step RA procedure on a physical RA channel (PRACH);
    receiving, from the terminal, a payload of the MsgA for the 2 step RA procedure on a physical uplink shared channel (PUSCH), the payload including a cell-radio network temporary identifier (C-RNTI); and
    transmitting, to the terminal, a physical downlink control channel (PDCCH) addressed to the C-RNTI included in the payload of the MsgA,
    wherein the 2 step RA procedure is successfully completed, in case that a time alignment timer (TAT) is running and the PDCCH schedules an uplink resource for a new transmission, and
    wherein the 2 step RA procedure is successfully completed, in case that the TAT is not running, the PDCCH schedules a downlink resource, and a timing advance (TA) command is transmitted based on the downlink resource.

6. The method of claim 5, wherein in case that an RA procedure is switched from the 2 step RA procedure to a 4 step RA procedure, an RA preamble for the 4 step RA procedure is selected from a same group of RA preambles as the 2 step RA procedure.

7. The method of claim 5, wherein in case that the 2 step RA procedure is switched to a 4 step RA procedure, a preamble transmission counter associated with a number of transmitting the MsgA, and a preamble power ramping counter associated with a transmission of the MsgA are maintained.

8. A terminal in a wireless communication system, the terminal comprising:
    a transceiver; and
    at least one processor configured to:
        transmit, to a base station via the transceiver, a random access (RA) preamble of a message A (MsgA) for a 2 step RA procedure on a physical RA channel (PRACH),
        transmit, to the base station via the transceiver, a payload of the MsgA for the 2 step RA procedure on a physical uplink shared channel (PUSCH), the payload including a cell-radio network temporary identifier (C-RNTI),
        receive, from the base station via the transceiver, a physical downlink control channel (PDCCH) addressed to the C-RNTI included in the payload of the MsgA,
        identify that the 2 step RA procedure is successfully completed, in case that the a time alignment timer (TAT) is running and the PDCCH schedules an uplink resource for a new transmission, and
        identify that the 2 step RA procedure is successfully completed, in case that the TAT is not running, the PDCCH schedules a downlink resource, and a timing advance (TA) command is received based on the downlink resource.

9. The terminal of claim 8, wherein the at least one processor is further configured to:
    determine to switch from the 2 step RA procedure to a 4 step RA procedure, in case that the 2 step RA procedure is not successfully completed and a number of transmitting the MsgA reaches to a specific value.

10. The terminal of claim 9, wherein the at least one processor is further configured to:
    select a same group of RA preambles as the 2 step RA procedure.

11. The terminal of claim 9, wherein
    a preamble transmission counter associated with the number of transmitting the MsgA, and a preamble power ramping counter associated with a transmission of the MsgA are maintained.

12. A base station in a wireless communication system, the base station comprising:
    a transceiver; and
    at least one processor configured to:
        receive, from a terminal via the transceiver, a random access (RA) preamble of a message A (MsgA) for a 2 step RA procedure on a physical RA channel (PRACH), receive, from the terminal via the transceiver, a payload of the MsgA for the 2 step RA procedure on a physical uplink shared channel (PUSCH), the payload including a cell-radio network temporary identifier (C-RNTI), and transmit, to the terminal via the transceiver, a physical downlink control channel (PDCCH) addressed to the C-RNTI included in the payload of the MsgA, wherein the 2 step RA procedure is successfully completed, in case that a time alignment timer (TAT) is running and the PDCCH schedules an uplink resource for a new transmission, and wherein the 2 step RA procedure is successfully completed, in case that the TAT is not running, the PDCCH schedules a downlink resource, and a timing advance (TA) command is transmitted based on the downlink resource.

13. The base station of claim 12, wherein in case that an RA procedure is switched from the 2 step RA procedure to a 4 step RA procedure, an RA preamble for the 4 step RA procedure is selected from a same group of RA preambles as the 2 step RA procedure.

14. The base station of claim 12, wherein in case that the 2 step RA procedure is switched to a 4 step RA procedure, a preamble transmission counter associated with a number of transmitting the MsgA, and a preamble power ramping counter associated with a transmission of the MsgA are maintained.

* * * * *